Figure 1:
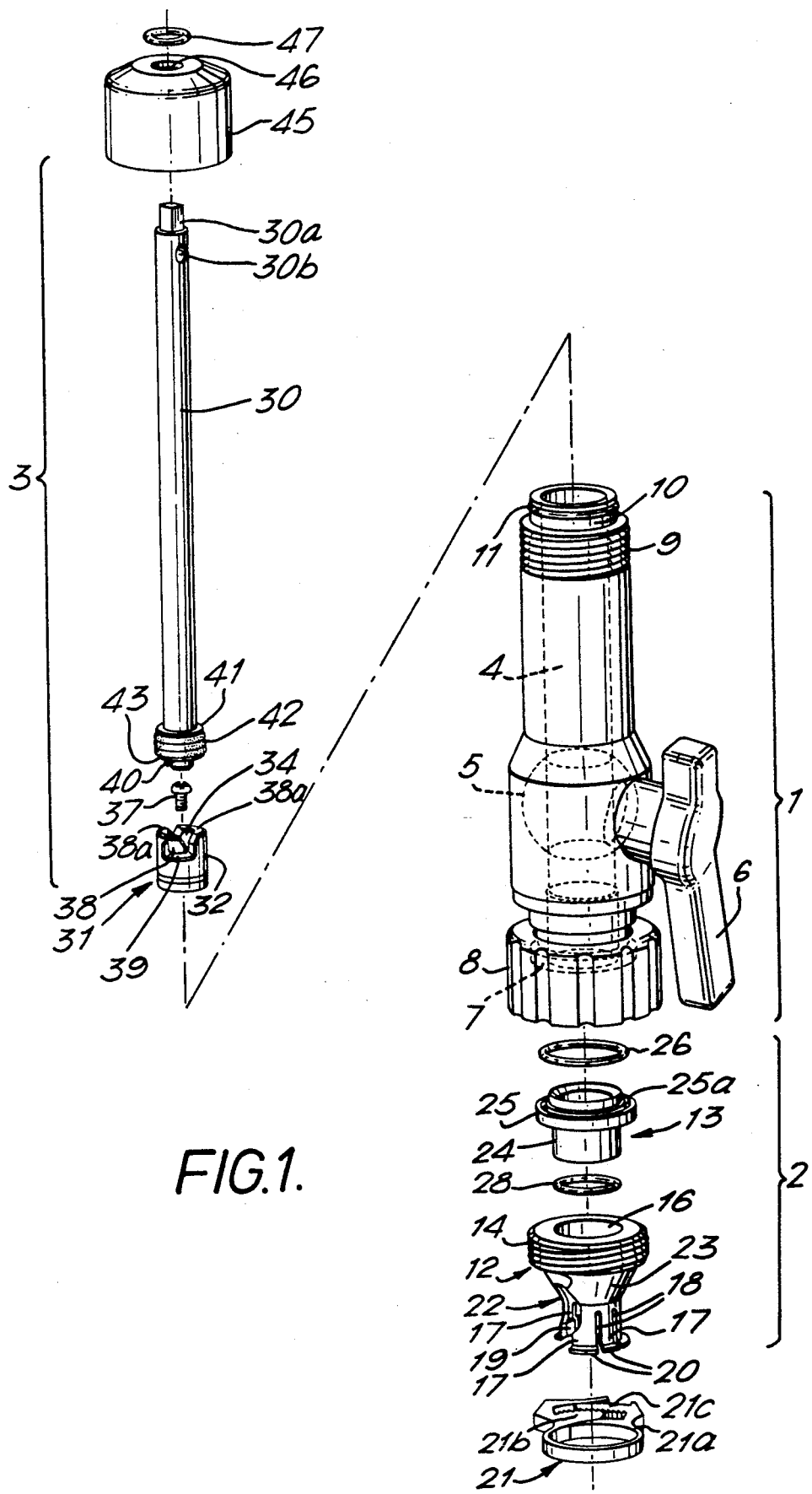

United States Patent [19]
Stickley

[11] Patent Number: 5,228,178
[45] Date of Patent: Jul. 20, 1993

[54] APPARATUS FOR USE IN SERVICING VALVES

[75] Inventor: Andrew J. Stickley, Bucks, United Kingdom

[73] Assignee: British Gas plc, London, England

[21] Appl. No.: 872,234

[22] Filed: Apr. 22, 1992

[30] Foreign Application Priority Data

Apr. 22, 1991 [GB] United Kingdom ............. 9108588

[51] Int. Cl.$^5$ .............................................. B23P 19/04
[52] U.S. Cl. .................................................. 29/213.1
[58] Field of Search ......... 29/213.1, 890.124, 890.121, 29/426.5, 237, 240

[56] References Cited

U.S. PATENT DOCUMENTS

| | | | |
|---|---|---|---|
| 2,517,870 | 8/1950 | Gump | 29/213.1 |
| 4,305,193 | 12/1981 | Anderson | 29/213.1 |
| 4,550,481 | 11/1985 | Preston | 29/213.1 |
| 4,597,147 | 7/1986 | Henry | 29/213.1 |
| 4,599,776 | 7/1986 | Haggard et al. | 29/213.1 |

FOREIGN PATENT DOCUMENTS

| | | |
|---|---|---|
| 29583/77 | 10/1979 | Australia . |
| 2654529 | 6/1978 | Fed. Rep. of Germany . |
| 315931 | 2/1929 | United Kingdom . |
| 1380278 | 12/1971 | United Kingdom . |

*Primary Examiner*—Robert C. Watson
*Attorney, Agent, or Firm*—Larson and Taylor

[57] ABSTRACT

Apparatus for radiator valve servicing has a main body 1 including a valve 5 and an adaptor 2 connecting the main body to a valve assembly support body 102. Mounted for movement within the main body is an extractor 3 comprising a shaft 30 and coupler 31 which is connected by a bayonet fitting 39,40 to the shaft and mechanically connected by a screw 37 to the valve assembly spindle 103. The coupler includes a socket 33 which fits on and facilitates unscrewing of the spindle and valve assembly from the support body. After being unscrewed, the valve assembly can be lifted past the valve 5 and, after closing the valve, withdrawn reliably from the main body because of the screw connection for servicing. A selection of adaptors and couplers enable a range of different valve systems to be serviced without draindown.

24 Claims, 8 Drawing Sheets

FIG.13.
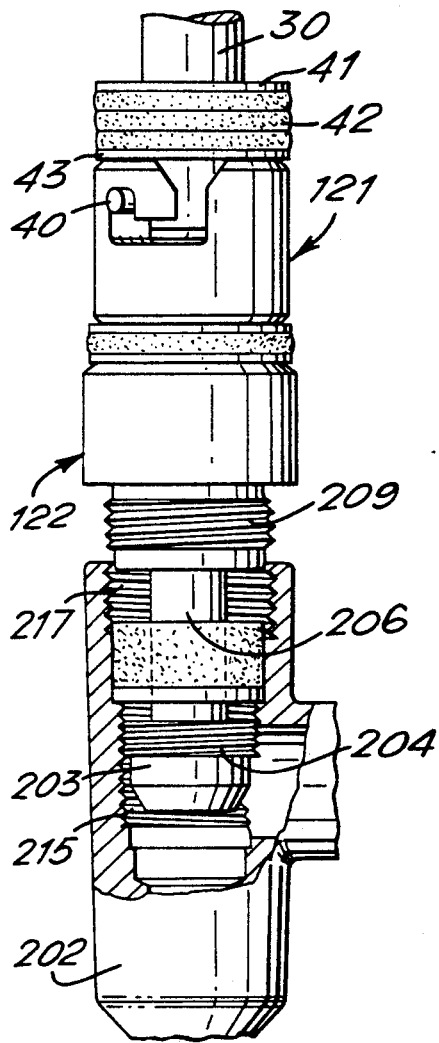
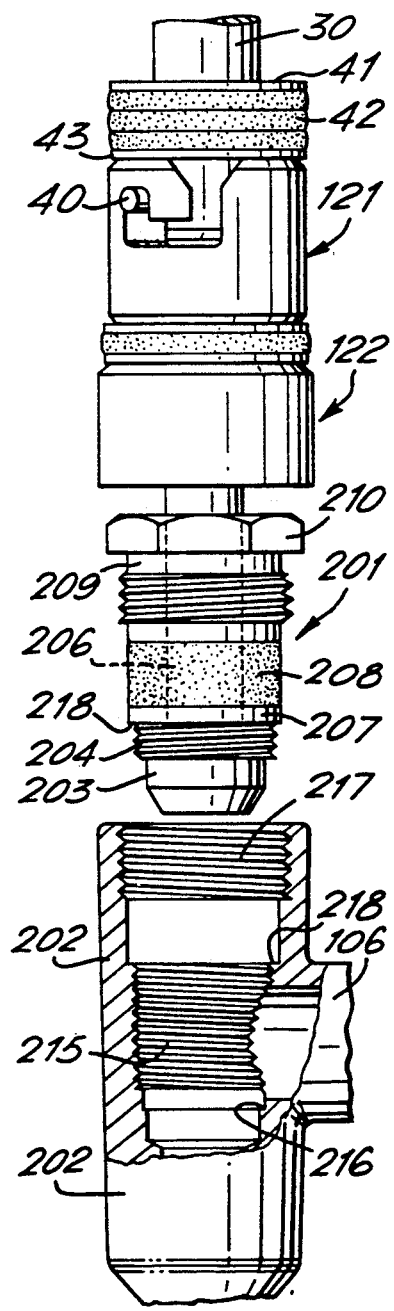
FIG.14.

APPARATUS FOR USE IN SERVICING VALVES

The present invention relates to an apparatus or a tool, for use in servicing valves and, more particularly, to such an apparatus or a tool for removing a valve assembly from a supporting body, for example, associated with a radiator of a 'wet' central heating system.

In one known form of 'wet', i.e. water-filled, central heating system which comprises a plurality of radiators connected in parallel, hot water under pressure passes through one or more of the radiators, as selected. In such a system each radiator may be provided with one valve at the water-inlet end of the radiator and another valve at the water-outlet end. By closing the valve at the inlet end the associated radiator may be turned off. When the valve at the outlet end is also closed the associated radiator is isolated from the remainder of the system.

When one of the valves becomes faulty, repair or replacement becomes necessary, and a common practice has been to replace the both the valve assembly and the supporting body into which the assembly fits and which comprises the valve seat.

In a known common method of removing the valve assembly the system has first to be drained of water and this can be very time consuming.

In another known method, where the valve assembly supporting body is provided with an externally threaded portion for receiving an internally threaded screw-on cover for the valve assembly and the valve assembly is a screw fit in the supporting body, a hand tool has been used for removing the valve assembly with the system still filled with water. The known tool comprises: a generally tubular main body having a bore extending therethrough; valve means in the main body operable, via a handle outside of the main body between a valve open position and a valve closed position with respect to the bore; and a valve assembly extractor rotatably and removably mountable on the main body so as to extend along and be movable along the bore. The extractor comprises: a shaft; a socket attached to one end of the shaft by a set screw; and a handle at the other end of the shaft. The socket includes fixed therein a rubber washer or grommet having a central aperture. The shaft is a sliding fit in an aperture in a cap which is a screw fit on one end of the main body. The other end of the main body is internally threaded so as to be a screw fit o the valve assembly supporting body in place of the screw-on cover.

In use, after the main body is screwed onto the valve assembly supporting body, the socket is pushed along the bore past the open valve in the main body to fit onto a nut on the valve assembly to be removed whilst the aperture in the grommet receives a pin extending from the valve assembly in a friction fit manner so that the pin is in effect resiliently clamped or held by virtue of the resilience of the grommet material around the pin. The handle on the shaft can then be turned so that the socket unscrews the valve assembly from the supporting body. After the valve assembly is fully unscrewed the shaft is slid through the bore of the main body away from the supporting body with the valve assembly being drawn along the bore with the socket by virtue of the friction fit of the pin in the grommet retaining the valve assembly in the socket. Once the valve assembly has been drawn along past the valve in the main body, the valve can be closed and then the cap can be unscrewed from the main body so that the shaft and socket together with the attached valve assembly may be removed from the main body. The valve assembly can then be pulled from the socket and inspected. Applicants have found, however, that the friction fit between the grommet and the pin may not be sufficient to retain the valve assembly in the socket during its removal from, or introduction back towards, the supporting body. Consequently, Applicants have found that the valve assembly may fall out of the socket whilst the tool is being used.

One kind of radiator valve system with which the Applicants is interested in being able to service in-situ, that is without having to drain down the system comprises a so-called wheel- or lockshield valve system or arrangement in which the valve assembly (incorporating the actual valve member) screw into the valve assembly support body (incorporating the valve seat with which the valve member co-operates). The valve assembly includes a shaft which is fixedly connected to the actual valve member. When the valve assembly is mounted in the support body, the shaft projects outwardly of the support body and has an external screw thread which extends part way along the shaft and which screws into an outer body. It is by rotating the shaft with respect to the outer body that the position of the valve member with respect to the valve seat can be adjusted.

The outer body includes a nut portion and is externally threaded so that the outer body, together with the valve member and connected shaft, can be screwed into and out of the internally threaded support body via application of torque to the nut portion. However, the valve assembly as a whole, including the outer body, can also be screwed into and out of the support body by applying torque to and rotating the shaft. When it is intended to remove the valve assembly in this latter manner it is preferred first to loosen off the tightness of the outer body in the support body. The outside of the support body is not provided with a threaded portion to receive a cap or a cover or the like.

The free end portion of the projecting shaft is provided with one or more flats to facilitate rotation of the shaft by means of a handle or spanner-like tool. The end of the projecting shaft has a threaded axially extending hole opening at the end face. By means of this hole a screw or threaded bolt is normally employed either to secure a handle, such as a wheel-handle (in the case of the so-called wheel valve arrangement), on the shaft for rotating the latter: or, alternatively, to secure a cap or cover to the shaft (in the case of the so-called lockshield valve arrangement) to protect the shaft and valve assembly.

Sometimes a cap or cover which is fitted to this kind of valve system does not make use of the hole in the top of the shaft but is designed to be a snap-fit over the valve assembly. However, the hole in the end of the shaft is still present.

An object of the invention is to provide a hand tool for use in servicing a radiator valve assembly which does not necessitate the presence of an external thread on the valve assembly support body.

Another object of the invention is to avoid having to rely on the valve assembly being held on the hand tool by a frictional grip as the valve assembly is removed from, or replaced in, the support body, and moved along the body of the tool.

According to the invention a tool for removing a valve assembly from a support body comprises a generally tubular main body having a bore extending therethrough, valve means in the main body operable between a valve open position and a valve closed position with respect to the bore, an adaptor means for connecting one end of the main body to the valve assembly support body, the adaptor means being adapted to be securable to the support body and adapted to be connected to an adaptor means-receiving part provided on the main body, a valve assembly extractor rotatably and removably mountable on the main body so as to be movable along the bore and comprising a shaft and, connected or connectible to the shaft, a coupling means which is adapted to be mechanically, positively coupled or secured to the valve assembly and which includes means for transmitting torque to the valve assembly.

The adaptor means allows the main body to be connected to a support body without the main body itself having to be so constructed as to be directly connectible to a support body of specific form.

When the coupling means is properly mechanically positively coupled or secured to the valve assembly the latter cannot slip off of the coupling means.

It will be appreciated that the tool should, advantageously, be substantially water tight in use under the conditions to which it is intended to be subjected. Thus, in use, the tool would, preferably, incorporate gaskets or seals such as O-ring seals to provide for positive sealing between connected parts or relatively movable parts of the tool and between the adaptor and the valve assembly support body to which it is temporarily secured.

The adaptor means and the receiving part of the main body may have interengageable means, such as interengageable screwthreaded portions, to enable connection therebetween.

Conveniently, either the adaptor means or the receiving part of the main body comprises an annular member which is provided with a respective one of the interengageable means and which is a captively mounted but a freely rotatable part of the adaptor means or the main body.

Preferably, the annular member is a freely rotatable part of the main body and is generally in the form of an internally threaded sleeve. The provision of such an annular member allows the main body to be connected to the adaptor means by rotating the annular member alone.

Conveniently, the adaptor means is a press- or snap-fit onto the valve assembly support body. The adaptor means may have two or more resilient portions for extending along the support body and which can resiliently flex outwardly of the adaptor means to enable the adaptor means to fit onto the support body.

Such resilient portions may have projections for extending behind regions or portions of the valve assembly support body to facilitate securing the adaptor means thereto. Preferably, a separate securing means may be provided for securing, or further securing, the adaptor means to the support body. For example, the securing means may comprise a clip or clamp which can encircle and be tightened around the resilient portions. The clamp may, conveniently, be in the form of a substantially annular flexible band having opposed releasably interlockable members which can be interengaged.

Advantageously, the adaptor means comprises one or more formations for retaining the securing means o the adaptor means when the securing means is in the operative securing position on the adaptor means. For example, where the resilient portions are encircled by the securing means, the resilient portions may comprise formations in the form of outwardly extending projections for preventing accidental separation or deliberate removal of the securing means from the adaptor means without first loosening or slackening such securing means.

The adaptor means may comprise a first body part (for mounting the adaptor on the valve assembly support body), an annular, resilient sealing means and a second body part in the form of an annular insert which, when the adaptor is connected to the main body compresses the sealing means against the first body part to cause the sealing means, when the adaptor means is secured to the support body, to press against the support body and provide a seal therebetween.

In a 'wet' radiator system, it is often the case that the valve assembly body has a side branch pipe extending therefrom to an associated radiator and another pipe extending from the bottom of the support body. Thus, the adaptor means may have a slot for accommodating such a side branch pipe. For example, the slot may extend from a mouth portion at the base of the adaptor means and terminate part way along the adaptor means at a region which is dimensioned and shaped or contoured to be a close or snug fit on the side branch and contributes to locating the adaptor means in its desired position on the support body.

In one embodiment the coupling means has an aperture via which a securing means can positively secure the coupling means to the valve assembly. For example, the securing means may be a threaded element, such as a screw or a bolt, for engaging in a threaded hole in the valve assembly. Thus the shank of such a screw or bolt may be passed through the aperture and screwed into the hole in the valve assembly so that the head of the screw or bolt engages and is tightened against the portion of the coupling means bounding the aperture to secure the coupling means to the valve assembly.

One form of valve system in which the Applicants are particularly interested and as described earlier, often already has a suitable screw engaged therewith securing a cap or cover on the valve assembly and the self-same screw may be used to secure the coupling means to the valve assembly once the cap or cover has been detached after removing the screw.

Preferably, the coupling means includes a socket part or recessed part for receiving a projection (such as the shaft described earlier) on the valve assembly via which the assembly can be screwed out of or into the support body. With this construction the aperture for receiving the threaded element may open into the socket part or the recessed part. The torque is transmitted from the socket part or recessed part to the projection.

The socket or recessed part described above may comprise a first socket or recessed part to which is connected a second, larger socket or recessed part, with the two parts being rotatable together about a substantially common axis of rotation when the first part is rotated. The first part is for receiving the shaft and the second part is for receiving a nut portion of the valve assembly similar to that described earlier.

The first and second parts may be rotatable with respect to each other to a limited extent.

Resilient, compressible means may be provided between portions of the first and second parts s that the two parts are movable relatively towards each other to compress the resilient means therebetween. Conveniently the two parts are rockable to a limited extent with respect to each other.

The capability of the two parts to rock and/or rotate with respect to each other has been found by the Applicants to facilitate jiggling or maneuvering the second socket or recess part onto the nut portion of the valve assembly when the assembly is being reinserted into the support body.

Conveniently, the coupling means is releasably connectible to the shaft by way of a bayonet fitting for simple and quick connection and disconnection therebetween. In one embodiment, one end of the shaft serves as the plug of such a fitting and is provided with the pins or projections thereof, and a portion of the coupling means serves as the socket of the fitting and provides the hook-like shaped slots which are for receiving and engaging with the bayonet fitting pins or projections on the shaft. Conveniently, the shaft may be provided with resilient means which is in compression when the coupling means and shaft are connected together by the bayonet fitting and the urge to expand by the compressed resilient means towards the relaxed condition serves to maintain the bayonet connection.

Advantageously, the tool may be supplied as part of a kit-of-parts also comprising a plurality of different adaptors and a plurality of different coupling means. The adaptors and coupling means are of different sizes and/or designs so that the kit facilitates the servicing of a range of radiator valve systems in which the valve assemblies and support bodies are of different sizes and/or designs. Thus, the kit may include specific adaptors and coupling means for particular valve systems. In the kit a single main body including the valve means and a single extractor shaft may be supplied which can be used with all of the adaptors and coupling means.

Figure 2:
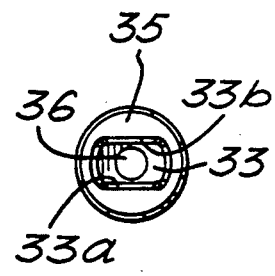
Figure 3:
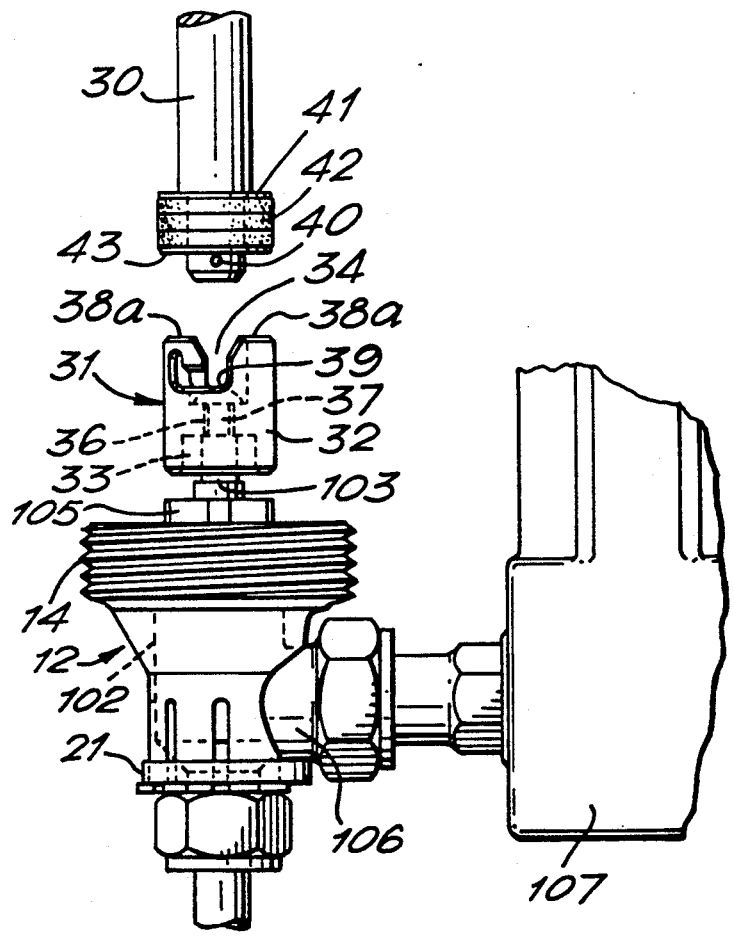
Figure 4:
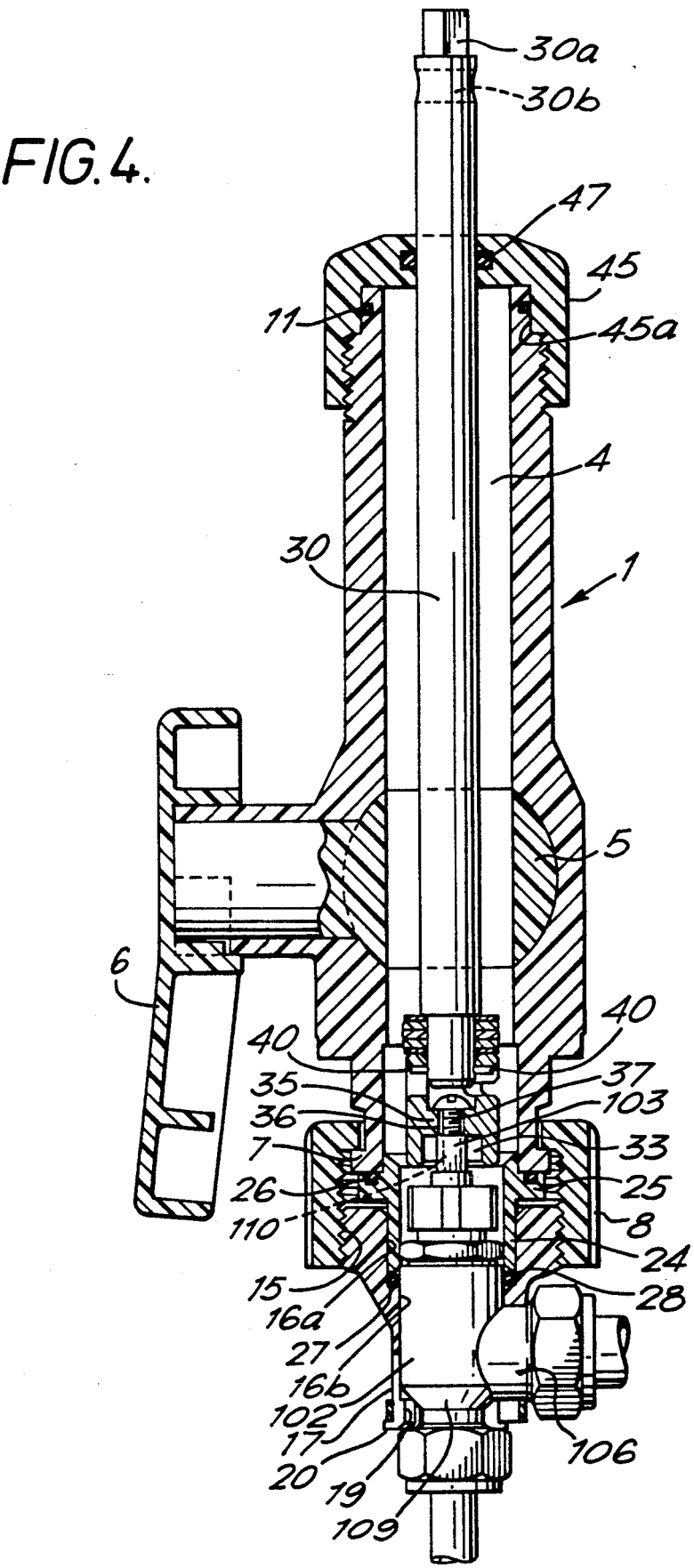
Figure 5:
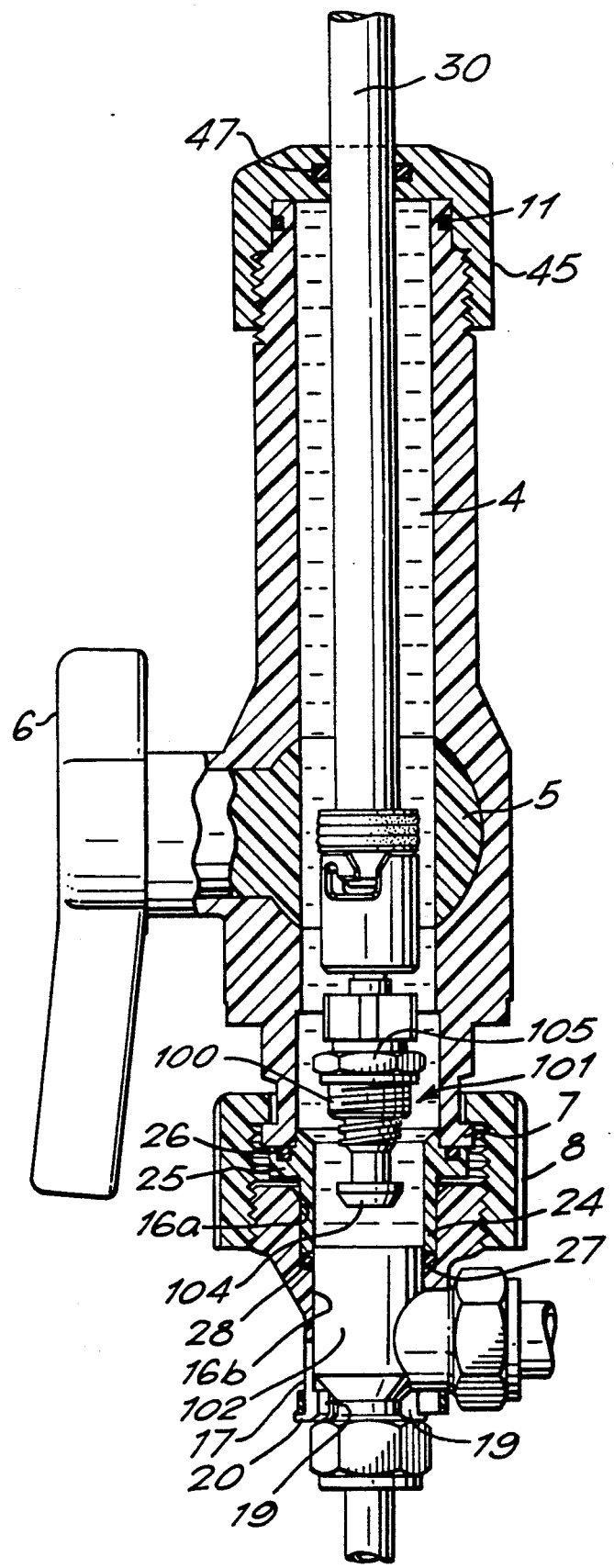
Figure 6:
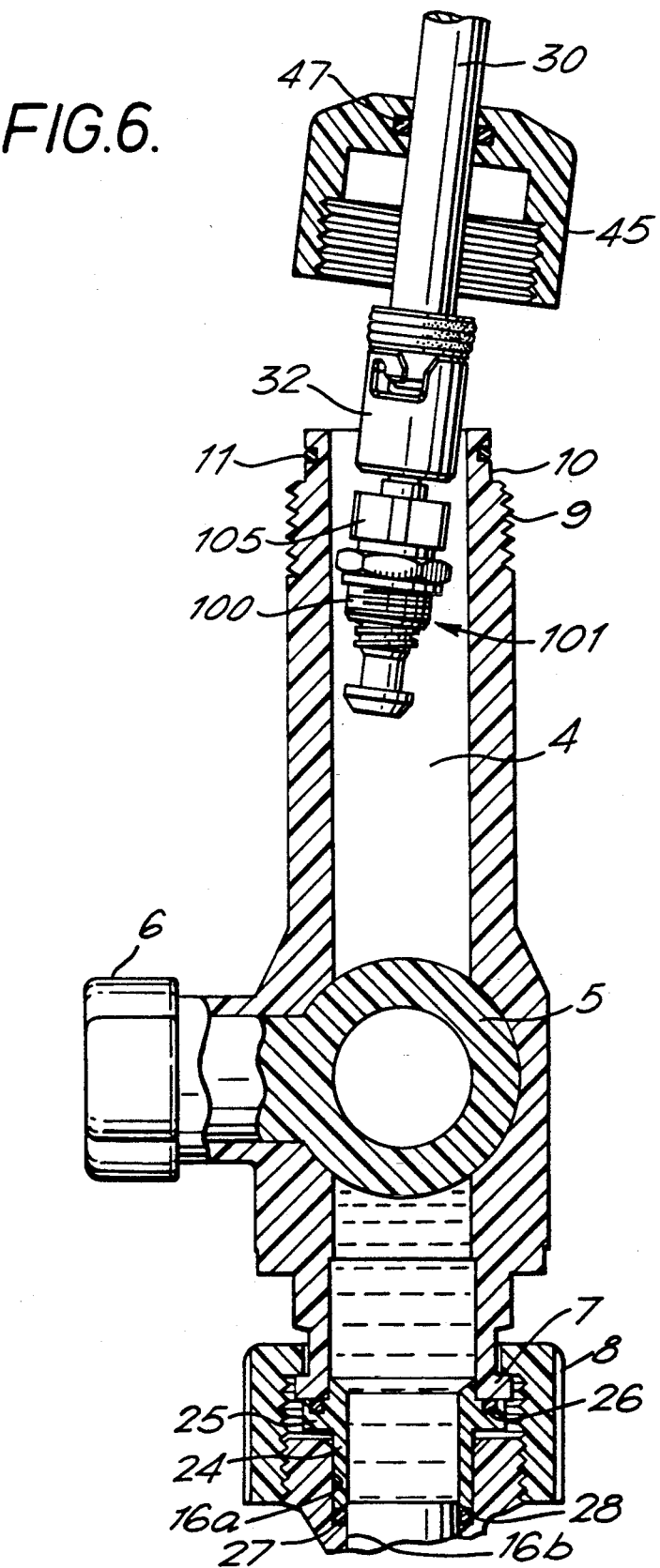
Figure 7:
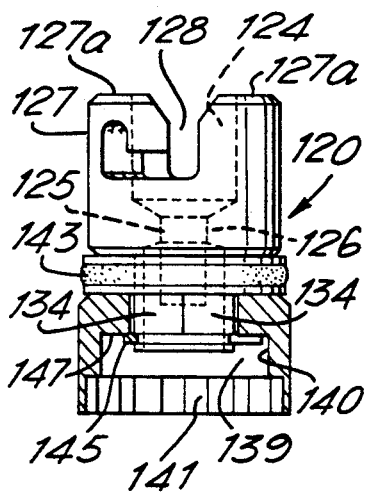

In order that the invention may be more readily understood, reference will now be made, by way of example only, to the accompanying drawings, in which:

FIG. 1 is an exploded view of one embodiment of tool or apparatus according to the invention, FIG. 2 is a view from below of the coupling means shown in FIG. 1, FIG. 3 is an elevational view showing the adaptor mounted on the valve assembly support body of a radiator valve system, the coupling means secured to the valve assembly, and the extractor shaft end to be connected to the coupling means, FIG. 4 is essentially a sectional view of the tool mounted on the radiator valve system with the extractor secured to the valve assembly prior to unscrewing the assembly from the support body, FIG. 5 is a similar view to FIG. 4 showing the valve assembly unscrewed and removed from the support body, FIG. 6 shows the valve assembly having been drawn past the valve means in the main body and the valve means closed, and the extractor with the attached valve assembly being removed from the main body, FIG. 7 is a side view, partly in section, of another form of coupling means.

Figure 8:
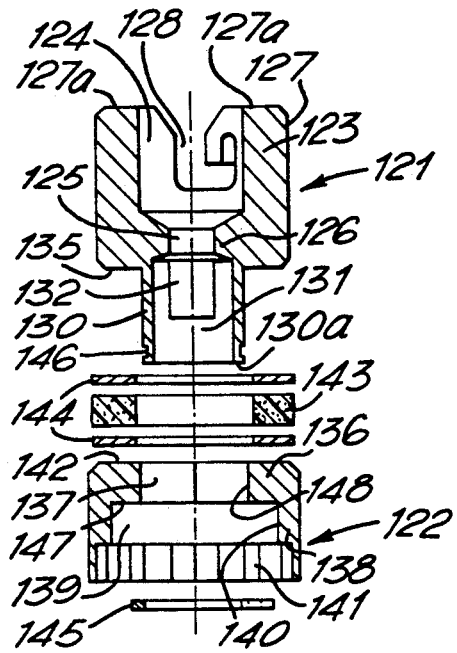
Figure 9:
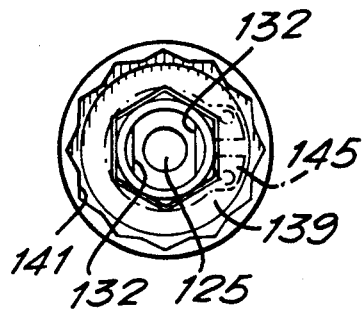
Figure 10:
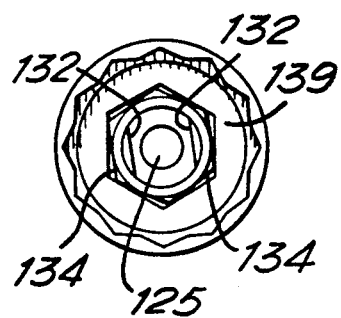
Figure 11:
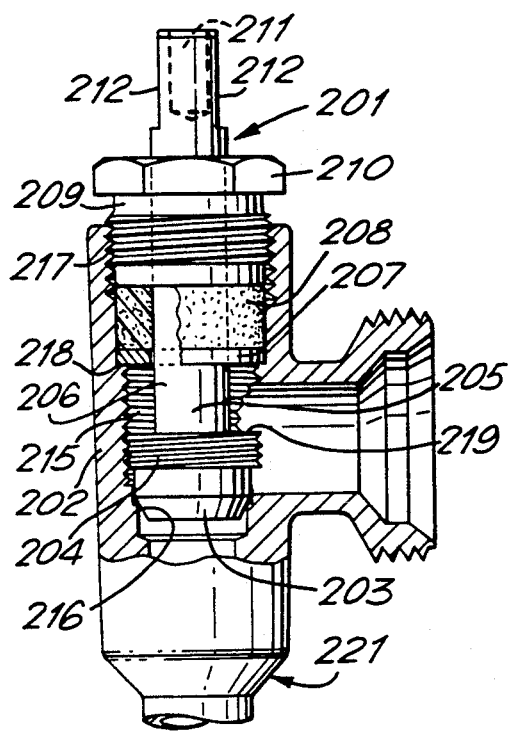
Figure 12:
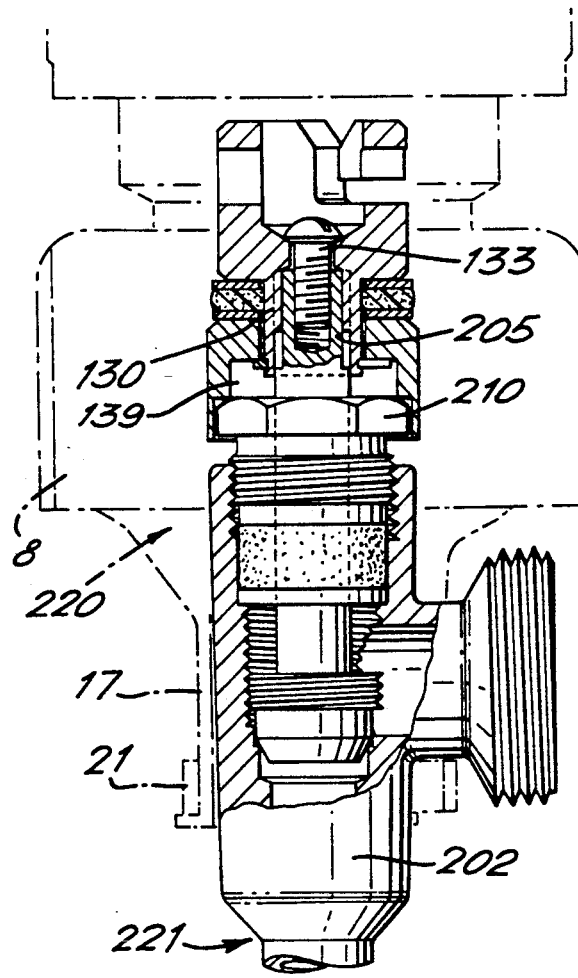

FIG. 8 is an exploded view, in section, of the coupling means shown in FIG. 7,

FIGS. 9 and 10 are views from below of the coupling means shown in FIGS. 7 and 8, indicating relative rotational movement which is possible between the first and second socket portions of the coupling means, FIG. 22 shows, partly in section, in the assembled condition, the valve assembly and support body of another form of radiator valve system on which apparatus according to the invention may be used, FIG. 12 shows the coupling means of FIGS. 7 and 8 secured to valve assembly shown in FIG. 11, and FIGS. 13 and 14 show, respectively, the valve assembly shown in FIG. 11 partly removed from and completely removed from the support body.

With reference to the drawings, one embodiment of tool for removing a valve assembly from a supporting body comprises a generally tubular main body 1, an adaptor 2 for connecting the lower end of the main body to a valve assembly support body and a valve extractor 3 which is mountable on the main body.

The main body has a bore 4 extending therethrough and includes a ball valve member 5 which is operable between an open position (wherein the valve defines a portion of the bore) and a closed position with respect to the bore 4. The valve member 5 is operated by a handle 6 connected to the valve member through the side of the main body.

The lower end of the main body 1 has an annular flange 7 which captively mounts an internally threaded annular member 8 o the main body such that the annular member is freely rotatable on the main body.

An upper end portion of the main body 1 is externally threaded as at 9. A tubular stub portion 10 of smaller external diameter extends upwardly from the threaded portion 9. In the external wall of the stub portion 10 there is located an O-ring seal 11 which extends around the stub portion.

The adaptor 2 comprises two main separate tubular parts 12 and 13. The part 12 has an upper externally threaded portion 14 for engagement with the internally threaded portion 15 of the annular member 8. A bore 16 extends through the part 12 from the upper end (as viewed in the figures) thereof to a region part way down from which extend downwardly a plurality of resilient portions or fingers 17 which are spaced by slots 18 and are disposed in a part circular array. The fingers 17 ar resiliently flexible both generally radially outwardly and inwardly with respect to their positions as shown in FIG. 1.

Projections 19 extend radially inwardly from the fingers for extending into a waisted or narrower region of the valve support body onto which the adaptor 2 is to be fitted, as will be described later.

The lower ends of the fingers are provided with outwardly extending projections or lugs 20 for retaining a securing clip 21 around the fingers when the adaptor is mounted on the valve support body.

The arrangement of the resilient fingers 17 are such as to enable the adaptor to be a snap- or press- fit onto the valve assembly support with which the adaptor is intended to be used.

As may be seen from the Figures the slot 22 provided between two of the fingers is dimensioned and shaped so that the adaptor will accommodate and fit closely around a substantial circumferential extent of a side branch pipe which extends laterally from the support body.

The upper end of the slot 22 terminates in a generally inverted U-shape in an upper body portion 23 of the part 12 such that the body portion 23 is provided in effect with a saddle portion which sits on the branch pipe and thereby locates the adaptor in the desired orientation on the support body.

The adaptor part 13 is in the form of an annular tubular insert having a lower cylindrical portion 24 for fitting into the upper end of the adaptor part 12. The part 13 is provided with an external annular flange 25 a little below the upper end. The upper side of the annular flange 25 has an annular groove 25a for locating an O-ring seal 26.

The bore 16 in the adaptor part 12 comprises an upper bore portion 16a and a lower bore portion 16b with an annular shoulder 27 therebetween. The upper bore portion 16a is of larger diameter than the lower portion 16b. The upper portion 16a is for closely or snugly receiving the lower cylindrical portion 24 of the insert. The internal diameter of tubular insert is substantially the same diameter as the lower bore portion 16b in the adaptor part 12. In use, an O-ring seal 28 of resiliently compressible material is placed on the shoulder 27 and then the lower cylindrical portion 24 of the insert 13 is inserted into the larger diameter portion 16a of the adaptor part 12.

When the annular member 8 is screwed down onto the threaded portion 14 of the adaptor, the underside of the flange 7 engages the O-ring seal 26 and the upper side of the annular flange 25 and causes the O-ring seal 28 to be compressed or squeezed between the lower end surface of the cylindrical portion 24 of the insert 13 and the shoulder 27 and as a result to protrude or to protrude further radially inwardly of the inner surfaces of the portions 12 and 13 for engagement with the external surface of the valve assembly support body, as will be described below.

The adaptor part 12 is positively secured to the support body by the securing clip or clamp 21 which comprises a substantially annular band 21a having a pair of opposed, interlockable members 21b,21c which can be interengaged so as to tighten the clamp in an encircling position on the adaptor around the resilient fingers 17.

The extractor 3 comprises a shaft or rod 30 and a coupling means 31 which is connectible to the shaft.

The coupling means 31 comprises a generally cylindrical body 32 having a recess 33 in the lower end for receiving the upper end portion of the spindle of the valve assembly such that opposite flats on the spindle are close fits between the opposing flat wall portions 33a,33b of the body 32 partly defining the recess 33.

The upper end of the body 32 is provided with a recess 34 and an axially extending aperture 36 in an intermediate wall 35 across the interior of the body connects the recesses 33 and 34. The aperture 36 allows a screw 37 to be located therein through the upper end of the body 32 and screwed into a threaded hole in the end of the spindle to secure the body thereto. The provision of the threaded hole in the spindle normally enables a cap or cover for the valve assembly to be secured to the spindle.

The annular wall 38 of the body 32 around the recess 34 has flat upper end surface portions 38a and includes hooked shaped slots 39 on opposite sides of the body having mouths tapering downwardly from the upper end surfaces 38a.

Adjacent the lower end of the shaft of the extractor ar diametrically aligned radially outwardly extending projections 40 for engaging in the slots 39 in the coupling body 31.

Spaced above the projections 40, a flat ring or washer 41 is fixedly secured to the shaft 30. Below the ring 41 a tubular sleeve 42 of compressible resilient material, such as silicon rubber surrounds the shaft 30 and is fixed, for example by adhesive, at its upper end surface to the lower surface of the ring (not shown). The sleeve 42 is not adhered or otherwise fixed to the outer cylindrical surface of the shaft 30. The lower end surface of the sleeve 42 is adhered to the upper surface of a second flat ring or washer 43 which surrounds the shaft with clearance and, is gently urged downwardly, by virtue of the resilience of the material of the sleeve 42, against the projections 40 Together the lower end part of the shaft 30 and the upper portion of the coupling body 31 provide the two parts of a bayonet kind of fitting. The shaft end serves as the plug with the projections and the coupling body serve as the socket of the bayonet fitting having the slots for receiving and engaging with the projections on the shaft. When the two parts are offered up to each other preparatory to effecting the bayonet connection, the lower surface of the ring 43 abuts and remains in contact with the upper surface 38a of the coupling body 31 whilst, with the projections 40 located within the mouths or openings of the slots 39, the shaft is pressed into the recess, turned and then released so that the projections 40 become lodged at the far ends of the slots 39 in the hooked regions and maintained thereat by virtue of the force associated with stressed (compressed) condition of the resilient sleeve 42. The force is sufficient for the shaft 30 to be maintained in an upright position on the coupling body 31, when the latter is secured to the spindle of the valve assembly and prior to the main body 1 being introduced over the extractor and connected to the adaptor 2 (as will be described below).

An internally threaded cap or top 45 is also provided for screwing onto the externally threaded upper end portion of the main body 1. The cap 45 has a central aperture 46 locating an ring seal 47 through which the upper end of shaft 30 of the extractor can be inserted. The O-ring seal 47 provides a substantially fluid tight seal between the cap and the shaft which latter is slidable through the ring. The O-ring seal 11 is engaged by an internal annular surface portion 45a of the cap 45 when the latter is screwed onto the top of the main body.

The main body 1, including the cap 45, and the adaptor means 2, apart from the O-ring seals may be made from suitable plastics materials, such as a polypropylene. The O-ring seals may be made of suitable compressible material, such as nitrile rubber, for example having a compressible Shore hardness of '60'. Applicants used O-ring seals which were capable of working at pressures of up to 5 bar or even to up 10 bar and at temperatures of up to about 110° C. The coupling means and extractor rod may, for example, be made of brass or stainless steel.

Use of the tool will now be described with particular reference to FIGS. 3 to 6.

In this example, a known kind of valve system on which the tool is to be used comprises a valve assembly 101 which is a screw fit into a support body 102. The valve assembly includes a spindle 103 to which is fixedly connected a valve member 104. The spindle screws into an outer body 100 which itself is externally threaded. The upper end of the spindle 103 is of square cross-section an projects above the support body. Turning of the spindle 10 allows the valve member 104 to be moved with respect to the valve seat (not shown) so that the valve system can be opened and closed. Nut 105 which forms a portion of the outer body 100 is the main means by which the outer body 100 and thus the valve assembly 101 is screw tightened into the support body 102 but once the nut is turned so that the valve assembly is loosened a little, turning of the spindle 103 in the appropriate direction allows the valve assembly, including the outer body 100, to be screwed completely out of the support body. The support body 102 has a side branch pipe 106 which is connected to one end of a radiator 107.

The radiator 107 would normally also have a valve at the opposite end (not shown) and this would be turned to the off position prior to the tool being used. Also the heat source, e.g. the boiler (also not shown), would be turned off.

The appropriate adaptor 2 for the valve system is selected and, with the nut 105 already having been loosened slightly and the two parts 12,13 with the interposed O-ring 28 being held together by hand, the assembled adaptor is pushed down over the top of the valve system so as to snap fit into the position shown. With the projections 19 of the resilient fingers 17 extending into the waisted region 108 of the support body beneath the frusto-conical portion 109 the clip 21 is then positioned around the lower end regions of the resilient fingers and the interlocking ends 21b,21c engaged and pushed tightly together to secure the part 12 and thus the adaptor as a whole in position on the support body 102. The O-ring 26 is then positioned in the annular groove 25a.

The appropriate coupling means 31 is selected and placed on the spindle 103 such that the spindle extends into the slot 33 and the bayonet-connection part faces upwards. The coupling means is then held so that the aperture 36 is in alignment with the threaded hole 110 in the end of the spindle and the screw 37 is passed through the aligned aperture and into the hole and then screwed up tight to secure the coupling means 31 on the spindle.

The extractor shaft 30 is then connected to the coupling mean by way of the bayonet fitting. When this connection has been made the extractor shaft extends upwardly from the coupling means.

The main body 1, with the valve member 5 in the open position, is then fitted over the upper end of the extractor rod 30 and the annular sleeve 8 is screwed onto the threaded portion 14 of the adaptor part 12. On tightening the annular sleeve the O-rings 26 and 28 are engaged between respective opposing portions of the tool to provide substantial water tightness between such portions. Moreover, the compressed O-ring 28 also forms a seal with the external surface of the support body 102.

Next, the threaded cap 45 with the O-ring 47 located thereon is placed over the upper end of the extractor shaft 30 and screwed onto the upper end of the main body. In this position the O-ring 11 forms a substantially water-tight seal between the main body 1 and the cap 45, and the O-ring 47 forms a substantially water-tight seal between the cap 45 and the extractor shaft 30 whilst allowing the shaft to be movable longitudinally through, and to be rotatable within, the O-ring.

In order to remove the valve assembly 101 from the support body 102 a spanner (not shown) is applied to the upper end 30a of the shaft and turned in an anticlockwise direction to rotate the shaft and thereby the connected coupling means 31 and the spindle 103 so that the valve assembly is unscrewed from the support body. Once it is completely unscrewed, the valve assembly is lifted from the support body by pulling the shaft 30 upwardly through the main body 1. A tommy bar (not shown) may be inserted through an opening 30b extending through the shaft to facilitate this operation. After the valve assembly has been drawn up past the open valve member 5 the latter is rotated by means of the handle 6 to a closed position.

The cap 45 can then be unscrewed from the main body 1 and the valve assembly 101 lifted out of the main body, as shown in FIG. 6. After disconnecting the shaft 30 from the coupling means and unscrewing the screw 37 to separate the valve assembly from the coupling means, the valve assembly can be examined, cleaned-up, have one or more gaskets or sealing members replaced or be completely replaced by a new or reconditioned valve assembly.

It will be appreciated that the reverse procedure to that described above is followed in order to locate the valve assembly back in the valve body.

Only a small amount of water may be lost from the radiator system during the removal and re-insertion of the valve assembly.

With reference to FIGS. 7 to 10, an alternative form of coupling means 120 will now be described.

The coupling means 120 comprises an upper body part 121 (as viewed in the figures) and a lower body part 122.

The upper portion 123 of the part 121 is generally cylindrical and is provided with a recess 124 and an axially extending aperture 125 in a wall 126 across the bottom of the cylindrical portion.

The annular wall 127 of the generally cylindrical portion 123 has flat upper end surface portions 127a and includes hooked shaped slots 128 on opposite sides of the body having mouths tapering downwardly from the upper end surfaces 127a. These features are for serving the same purposes as the corresponding features of the earlier described form of coupling means 31.

The lower portion 130 of the upper body part 121 is generally tubular and extends downwardly integrally from the wall 126. The aperture 125 connects the recess 124 with the interior of the tubular portion into which the aperture 125 opens. The tubular portion 130 provides a first socket part 131 for receiving the upper end portion of the spindle or shaft of the valve assembly on which the apparatus is to be used. Opposite internal wall portions of the tubular portion 130 are provided with flats 132 between which flats on the spindle closely fit. The aperture 125 allows a screw 133 (see FIG. 12) to be located therein via the upper end of the cylindrical portion 123 and screwed into a threaded hole in the end of the spindle. The external surface 134 of the tubular portion is hexagonal.

The upper cylindrical portion 123 is of larger diameter than the tubular portion 130 and provides a downwardly facing annular surface 135 which surrounds the tubular portion at the junction with cylindrical portion 123. The lower body part 122 has an end portion 136 which has a central aperture 137 and from which a generally cylindrical wall 138 extends downwardly defining a second socket part 139. The internal wall 140 at the lower end of the socket part 139 is adapted as at 141 to receive and engage the flats of the nut portion of a valve assembly and thereby facilitate the application of torque to such nut portion.

The aperture 137 is of hexagonal shape and slightly larger in cross-sectional dimensions than those of the hexagonal shape tubular portion 130 so that the latter fits through the aperture 137 with a little clearance. The aperture 137 is surrounded by an upwardly facing annular surface portion 142. A ring of resilient compressible material 143, such as silicon rubber, is sandwiched between two rigid washers 144. The two washers 144 and the ring of material 143 are mounted with clearance on the tubular portion 130 and located between downwardly facing annular surface 135 and the upwardly facing annular surface 142, whilst the two body parts 121 and 122 are secured together by means of a spring clip 145 which fits in a circumferential recess 146 which extends around the outside of the tubular portion 130 closely adjacent the free end 130a thereof. The clip 145 engages the underside 147 of the upper end portion 136 of the lower body part 122. The construction of the coupling means is such that the ring of resilient material 143 is normally in a slightly compressed state between the two washers 144 and the two body parts 121 and 122, and allows the two body parts to move relatively towards each other to compress the material further therebetween.

The clearance between the tubular portion 130 and the wall 148 of the upper end portion which defines the central aperture 137 permits the two body parts 121 and 122 (and thus the two socket parts) to be both rotatable and rockable with respect to each other to limited extents.

The limited extent to which the two body parts 121 and 122 may be rotated with respect to each other may be appreciated from the different relative positions of hexagonal sides of the tubular portion 130 and the hexagonal sides of the aperture 137 in FIGS. 9 and 10.

The provision of the resilient compressible material between the two body parts 121 and 122 provides some rigidity to the coupling means when the two parts are rocked relative to each other such that one region of the material may be further compressed whilst a diametrically opposite region may be in a relative expanded condition.

FIG. 11 shows, partly in section, the radiator valve system on which apparatus including the coupling means 120 is to be used in this example.

The valve system comprises a valve assembly 201 which is a screw fit in a support body 202.

The valve assembly comprises a valve member 203 having an externally threaded portion 204, and a shaft or spindle 205 which is fixedly connected to the valve member. The shaft has, extending from the valve member, a plain external cylindrical surface portion 206 which locates on the shaft a rigid washer 207, a plug 208 in the form of a washer, and an externally threaded body 209 having a nut portion 210. The external diameter of the threaded body 209 is larger than that of the threaded portion 204 of the valve member 203. The free end of the shaft is provided with a threaded hole 211 and flats 212 to facilitate turning of the shaft by a spanner or like tool.

The threaded portion 204 of the valve member screws into an internally threaded portion 215 of the support body extending from close to a valve seat 216 for the valve member. The threaded body 209 screws into a larger diameter internally threaded portion 217. Normally the threaded body 209 compresses the plug 208 against the washer 207 which is located in position on an annular shoulder 218 provided by the support body, to mount the valve assembly in substantially a fluid tight manner in the support body 202. Turning of the shaft enables the valve member to be moved between the closed position, whereat the valve member is in engagement with the valve seat 216, and a fully open position, whereat the top surface 219 of the valve member abuts the underneath side of the washer 207, whereby the position of the valve can be adjusted.

With this valve system, when both the valve member portion 204 and the threaded body 209 are in respective screw threaded engagement in the support body, the valve assembly cannot be removed from the support body by rotating the shaft 205 alone in the appropriate direction; both the shaft 205 and the threaded body 209 have to be rotated individually.

In use of the apparatus as regards this example of a valve system, the coupling means 120 is mounted over the top of the spindle 205 so that the flats 212 of the spindle are located between the flats 132 in the tubular socket part 131 and the nut portion 210 is received within the socket part 139 at the region 141. A screw 219 is used to secure the coupling means to the spindle by inserting the screw through the aperture 125 and screwing it into the threaded hole 211 of the spindle.

Since the apparatus is otherwise assembled in essentially the manner described previously, the full assembly is not shown in FIGS. 12 to 14. However, in this particular example the resilient fingers 17 of the appropriate adaptor 220 (shown in part in outline in FIG. 12) do not have inwardly directed projections since the fingers do not extend down to the waisted region of the support body. A portion of the top edge of the clip 21 contacts the underside of the branch pipe 106 to secure the apparatus on the support body.

With the apparatus assembled for use, the shaft 30 of the apparatus is rotated so that the nut portion 210 and the spindle 205 are, initially, unscrewed at the same time as the socket part 139 and the socket portion 130 rotate together.

In the position shown in FIG. 13, the nut portion 210 (and thus associated threaded body 209) has been completely unscrewed from the threaded portion 217 of the support body. Continued rotating of the shaft 30 of the apparatus allows the threaded portion 204 to be completely unscrewed from the threaded portion 215 of the support body and the valve assembly to be withdrawn completely from the support body, as shown in FIG. 14, in the same manner as described above with reference to the earlier mentioned valve system.

Again, the reverse procedure is followed to relocate the valve assembly in the support body. As mentioned earlier, Applicants have found that the capability of the body part 122 to rock relative to body part 121 can assist in locating the socket par 139 properly onto the nut portion 210 since in the initial stages of reinserting the valve assembly the threaded body 209 may slide down the shaft 205 with the result that the nut portion loses contact with the socket part 139, as for example shown in FIG. 14.

It will be appreciated that various modifications may be made without departing from the scope of the invention. For example, if found to be acceptable, the coupling means may comprise a single body having two socket portions corresponding to socket parts 131 and 139. Also, the adaptor 220 could be modified so as to have longer flexible fingers 17 which have inwardly directed projections which extend into the waisted region 221 of the support body 202 to facilitate securing the apparatus to the support body.

I claim:

1. Apparatus for removing a valve assembly from a valve assembly support body, said apparatus comprising a generally tubular main body having a bore extending therethrough, valve means in the main body operable between a valve open position and a valve closed position with respect to the bore, an adaptor means for connecting one end of the main body to the valve assembly support body, the adaptor means including a push-on means for resiliently securing said adaptor means to the support body and adapted to be connected to an adaptor means-receiving part provided on the main body, a valve assembly extractor rotatably and removably mountable on the main body so as to be movable along the bore and comprising a shaft and, connectible to the shaft, a coupling means which is adapted to be mechanically, positively coupled to the valve assembly and which includes means for transmitting torque to the valve assembly.

2. Apparatus as claimed in claim 1, in which the main body and the adaptor means comprise interengageable means to enable connection therebetween.

3. Apparatus as claimed in claim 2, in which the main body and adaptor means comprise interengageable screw-threaded portions.

4. Apparatus as claimed in claim 2, in which either the adaptor means or the one end of the main body comprises an annular member which is provided with a respective one of the interengageable means and which is a captively mounted but a freely rotatable part thereof.

5. Apparatus as claimed in claim 4, in which the annular member is a freely rotatable part of the main body and is in the form of an internally screw-threaded sleeve.

6. Apparatus as claimed in claim 1, in which the push-on means of the adaptor means has two or more resilient portions for extending along the support body and which can resiliently flex outwardly of the adaptor means to enable the adaptor means to be releasably fit onto the valve assembly support body.

7. Apparatus as claimed in claim 6, in which the resilient portions have projections for extending behind regions or portions of the valve assembly support body to facilitate securing the adaptor means thereto.

8. Apparatus as claimed in claim 6 further comprising a securing means for encircling the resilient portions and positively securing the adaptor means to the valve assembly support body.

9. Apparatus as claimed in claim 8, in which the adaptor means comprises one or more formations for retaining the securing means on the adaptor means when the securing means is in the operative securing position on the adaptor means.

10. Apparatus as claimed in claim 8, in which the securing means comprises a substantially annular flexible band having opposed releasably interlockable members which can be inter-engaged.

11. Apparatus as claimed in claim 1, in which the adaptor means comprises an annular sealing means which, when the adaptor means is connected to the valve assembly support body, substantially forms a seal between the adaptor means and the support body.

12. Apparatus as claimed in claim 11, in which the adaptor means comprises a first body part, an annular, resilient sealing means and a second body part in the form of an annular insert which, when the adaptor means is connected to the main body compresses the sealing means against the first body part to cause the sealing means, when the adaptor means is secured to the support body, to press against the support body and provide a seal therebetween.

13. Apparatus as claimed in claim 1, in which the adaptor means has a slot in which a side branch pipe extending from the valve assembly support body is received.

14. Apparatus as claimed in claim 1, in which the coupling means has an aperture via which a securing means can secure the coupling means to the valve assembly.

15. Apparatus as claimed in claim 14, in which the coupling means includes a recessed part for receiving a projection on the valve assembly, whereby torque can be transmitted from the recessed part to the projection.

16. Apparatus as claimed in claim 15, in which the aperture opens into the recessed part.

17. Apparatus as claimed in claim 15 or 16, in which the recessed part comprises a first such part to which is connected a second, larger socket or recessed part, the first and second parts being rotatable together about a substantially common axis when the first part is rotated.

18. Apparatus as claimed in claim 17, in which the first and second parts are rotatable with respect to each other to a limited extent.

19. Apparatus as claimed in claim 17, in which resilient, compressible means is provided between portions of the first and second parts, the first and second parts being movable relatively towards each other so as to compress the resilient, compressible means therebetween.

20. Apparatus as claimed in claim 17, in which the first and second parts are rockable to a limited extent with respect to each other.

21. Apparatus as claimed in claim 1, in which the coupling means is releasably connectible to the shaft by way of a bayonet fitting.

22. Apparatus as claimed in claim 21, in which one end of the shaft serves as a plug of a fitting and is provided with projections thereof, and a portion of the coupling means serves as a socket of the fitting and provides slots which are for receiving and engaging with the projections on the shaft.

23. Apparatus as claimed in claim 21, in which the shaft is provided with resilient means which is in compression when the coupling means and shaft are connected together by the bayonet fitting and serves to maintain the connection.

24. Apparatus for removing a valve assembly from a support body as claimed in claim 1, comprising a plurality of said adaptor means and a plurality of said coupling means of various configurations for use with valve assemblies of various associated configurations.

* * * * *